United States Patent
Nam et al.

(10) Patent No.: US 8,865,085 B2
(45) Date of Patent: Oct. 21, 2014

(54) SYSTEM FOR MAINTAINING FRESHNESS INCLUDING FLEXIBLE CONDUCTING POLYMER ELECTRODE

(75) Inventors: Yun Woo Nam, Yongin-Si (KR); Soo Bong Heo, Yongin-Si (KR); Jae Chan Park, Yongin-Si (KR)

(73) Assignee: Samsung Electronics Co., Ltd. (KR)

( * ) Notice: Subject to any disclaimer, the term of this patent is extended or adjusted under 35 U.S.C. 154(b) by 1818 days.

(21) Appl. No.: 11/780,771

(22) Filed: Jul. 20, 2007

(65) Prior Publication Data
US 2008/0063579 A1 Mar. 13, 2008

(30) Foreign Application Priority Data
Sep. 7, 2006 (KR) .................. 10-2006-0086206

(51) Int. Cl.
*B01J 19/08* (2006.01)

(52) U.S. Cl.
USPC .................................................. 422/186.04

(58) Field of Classification Search
USPC ...................................... 422/186.04, 186.07
See application file for complete search history.

(56) References Cited

U.S. PATENT DOCUMENTS

| 5,529,760 | A  | * | 6/1996 | Burris ....................... 422/186.07 |
| 6,350,417 | B1 | * | 2/2002 | Lau et al. ................. 422/186.04 |
| 6,753,994 | B1 | * | 6/2004 | Russell ......................... 359/254 |
| 7,344,685 | B2 | * | 3/2008 | McNulty .................. 422/186.07 |
| 7,455,758 | B2 | * | 11/2008 | Muller et al. .................. 204/547 |
| 2003/0108460 | A1 | * | 6/2003 | Andreev et al. .......... 422/186.07 |

FOREIGN PATENT DOCUMENTS

| JP | S591984-105296 | 6/1984 |
| JP | 64-090517 | 4/1989 |
| JP | 08-078151 | 3/1996 |
| JP | 11-137185 | 5/1999 |
| JP | 2003-047413 | 2/2003 |
| KR | 10-1993-0023681 | 12/1993 |
| KR | 10-2005-0063292 | 6/2005 |

* cited by examiner

*Primary Examiner* — Kishor Mayekar
(74) *Attorney, Agent, or Firm* — Cantor Colburn LLP (57) ABSTRACT

A system for maintaining the freshness of an object of preservation comprising an electrode made of a flexible conducting polymer. The system includes: an electrode module comprising a first electrode and a second electrode which face each other; and an electric field supply module generating an electric field between the first electrode and the second electrode by supplying a voltage to the electrode module, and where the first electrode is comprised of a flexible conducting polymer material.

14 Claims, 10 Drawing Sheets

iii)

TRANS-POLYACETYLENE ii)

CIS-POLYACETYLENE iii)

POLYANILINE : LEUCOEMERALDINE BASE (y=0),
EMERALDINE BASE (y=0.5),
PERNIGRANILINE BASE (y=1)

iv)

POLYPYRROLE v)

POLYTHIOPHENE vi)

POLY(P-PHENYLENE)

vii)

POLY(P-PHENYLENEVINYLENE)

SYSTEM FOR MAINTAINING FRESHNESS INCLUDING FLEXIBLE CONDUCTING POLYMER ELECTRODE

CROSS-REFERENCE TO RELATED APPLICATION

This application claims the benefit of Korean Patent Application No. 10-2006-0086206, filed on Sep. 7, 2006, in the Korean Intellectual Property Office, the entire contents of which are hereby incorporated by reference.

BACKGROUND OF THE INVENTION

1. Field of the Invention

The present invention relates to a system for maintaining the freshness of an object of preservation. More particularly, the present invention relates to a system for maintaining freshness comprising an electrode made of a flexible conducting polymer.

2. Description of Related Art

The cell membrane of all organisms comprise free ions, e.g. $K^+$, $Na^+$, $Cl^-$, $Ca^2$. These free ions function as follows: i) they control the volume of the cell by generating an osmotic pressure that controls both the entrance of water into a cell as well as the amount of water present in a cell; ii) they play a key role in other metabolic processes, such as transduction processes; and iii) they generate a strong electric field of $10^7$ V/m across the cell membrane. Ion flux via the cell membrane is generated by the concentration of free ions present within the cell membrane and the voltage which exists within the cell membrane.

The difference in the electrical potential of the cell membrane may be a sum of the contribution of all free ions present in the cell. When an external electrical field is supplied to an organism, two possible results can occur. First, when the external electric field is static, the polarization in the cell has a predetermined direction and size, and when the external electric field oscillates, the free ions are forced to vibrate. Second, when the external electric field is harmonic or alternating, the external electric field functions as a periodic force not only on all ions present in the plasma membrane but also on all ions present in a protein channel. The alternating external electrical field promotes all free ions to vibrate. When an amplitude of the oscillation of the ions is greater than a predetermined threshold, the oscillating ions may give an erroneous signal of "open and close signal" of the protein channel, i.e. a voltage-gated channel. This phenomenon may disrupt the electrochemical balance of the cell membrane, and which subsequently may hinder the entire function of the cell.

There are various theories concerning the mechanism by which an external electric field effects a microorganism. There are also many diverse methods described for controlling a microorganism by using an electric field. The above theories are generally directed to the following concepts. A high electric voltage shock generates a different electric potential on the inside of the cell membrane as compared to the electric potential outside of the cell membrane. When an electric potential difference of about 1 V occurs between the inside of the cell membrane and the outside of the cell membrane, the cell membrane is either destroyed or, is electrically shocked by the high intensity electric field. Thus, the cell membrane of the microorganism cell is irreversibly damaged or destroyed. In addition, a high intensity electric field may destabilize the double lipid layer of the membrane or the membrane proteins, and consequently the microorganism cell may be destroyed.

Figure 1:
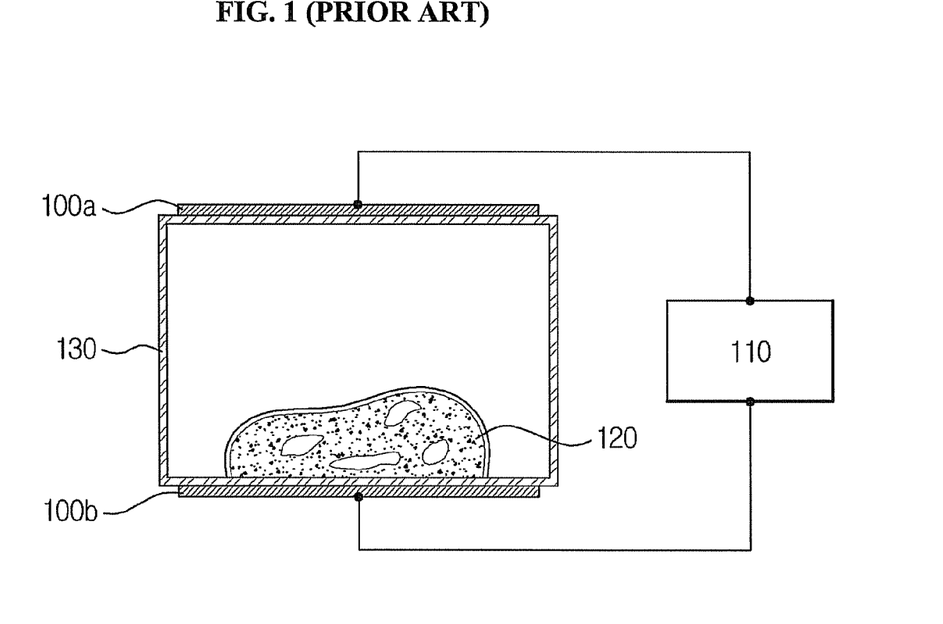
FIG. 1 is a diagram illustrating a structure of a prior art apparatus for maintaining freshness.

FIG. 1 is a diagram illustrating a prior art structure of an apparatus for maintaining freshness. Referring to FIG. 1, the apparatus for maintaining freshness includes electrode modules 100a and 100b, and an electric field supply module 110.

The electrode modules 100a and 100b, which correspond to an anode 100a and a cathode 100b respectively, face each other. The electrode modules 100a and 100b are located in a housing member 130 where an object of preservation 120 is located, and are electrically connected with the electric field supply module 110.

The electric field supply module 110 supplies a voltage to the anode 100a and the cathode 100b, generating an electric field comprising a predetermined frequency range between the anode 100a and the cathode 100b, and controlling the frequency range of a supplied voltage. The anode 100a and the cathode 100b may be a conductive material, any one of gold (Au), silver (Ag), nickel (Ni), chrome (Cr), copper (Cu), Suss (Stainless steel), and indium tin oxide (ITO). In addition, the housing member 130 provides a space where the object of preservation 120 is positioned, and an adiabatic member (a heat insulator) may be disposed between an interior wall and an exterior wall of the housing member 130.

In the prior art apparatus for maintaining freshness, as illustrated in FIG. 1, the distance between the object of preservation 120 and the electrode is comparatively great, the efficiency of generating an electric field may be reduced. Also, since the surface of the object of preservation 120 is located beyond the effective range of the electric field, a microorganism present in the object of preservation 120 may not be effectively controlled by the electric field. In addition, since the efficiency of generating the electric field is low, a significant amount of power is required to apply an electric charge to the surface of the object of preservation 120.

Further, the distance between the shelves is constant, but the size and the shape of the object of preservation constantly change. Accordingly, the effect of an electric field applied to the surface of the object of preservation may not be constantly and uniformly controlled.

BRIEF SUMMARY

In one embodiment, the present invention provides a system for maintaining freshness comprising a flexible conducting polymer, which makes contact with a surface of an object of preservation and supplies a highly efficient electric field to the object of preservation.

In another embodiment, the present invention also provides a highly efficient system for maintaining freshness which enables an electrode to make contact with a surface of an object of preservation, thereby uniformly generating a surface electric charge on the object of preservation for a short period of time.

In yet another embodiment, the present invention provides a system for maintaining freshness which can supply a highly efficient electric field by using an electrode comprising a flexible conducting polymer, and thereby consuming a small amount of power.

According to one aspect, the present invention provides a system for maintaining freshness, in which an electrode is substitutable, i.e. detachable, by using an electrode comprising a flexible conducting polymer.

According to another aspect, the present invention provides a system for maintaining freshness that is manufactured at a low cost.

According to yet another aspect of the present invention, there is provided a system for maintaining freshness comprising an electrode module which comprises a first electrode and a second electrode which face each other; and an electric field supply module which generates an electric field with a predetermined frequency range between the first electrode, made of a flexible conducting polymer material, and the second electrode, by supplying a voltage to the electrode module.

BRIEF DESCRIPTION OF THE DRAWINGS

The above and/or other aspects and advantages of the present invention will become apparent and more readily appreciated from the following detailed description, taken in conjunction with the accompanying drawings of which.

DETAILED DESCRIPTION OF EMBODIMENTS

Hereinafter, various embodiments will be explained in more detail with reference to, the accompanying drawings, wherein like reference numerals refer to the like elements throughout.

As used herein, an "object of preservation" refers to any object which is in need of preservation. Specifically, an object of preservation refers to an object which may become spoiled, or which may become rotten, due to the presence and/or growth of microorganisms. More specifically, these objects require preservation from decomposition or fermentation. Suitable examples of objects requiring preservation include any substance that can be used for food or prepared for use as food, such as pre-prepared foods, raw foods, meats, and the like.

It will be understood that when an element or layer is referred to as being "on," "interposed," "disposed," or "between" another element or layer, it can be directly on, interposed, disposed, or between the other element or layer or intervening elements or layers may be present.

It will be understood that, although the terms first, second, third, and the like may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, first element, component, region, layer or section discussed below could be termed second element, component, region, layer or section without departing from the teachings of the present invention.

As used herein, the singular forms "a," "an" and "the" are intended to comprise the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
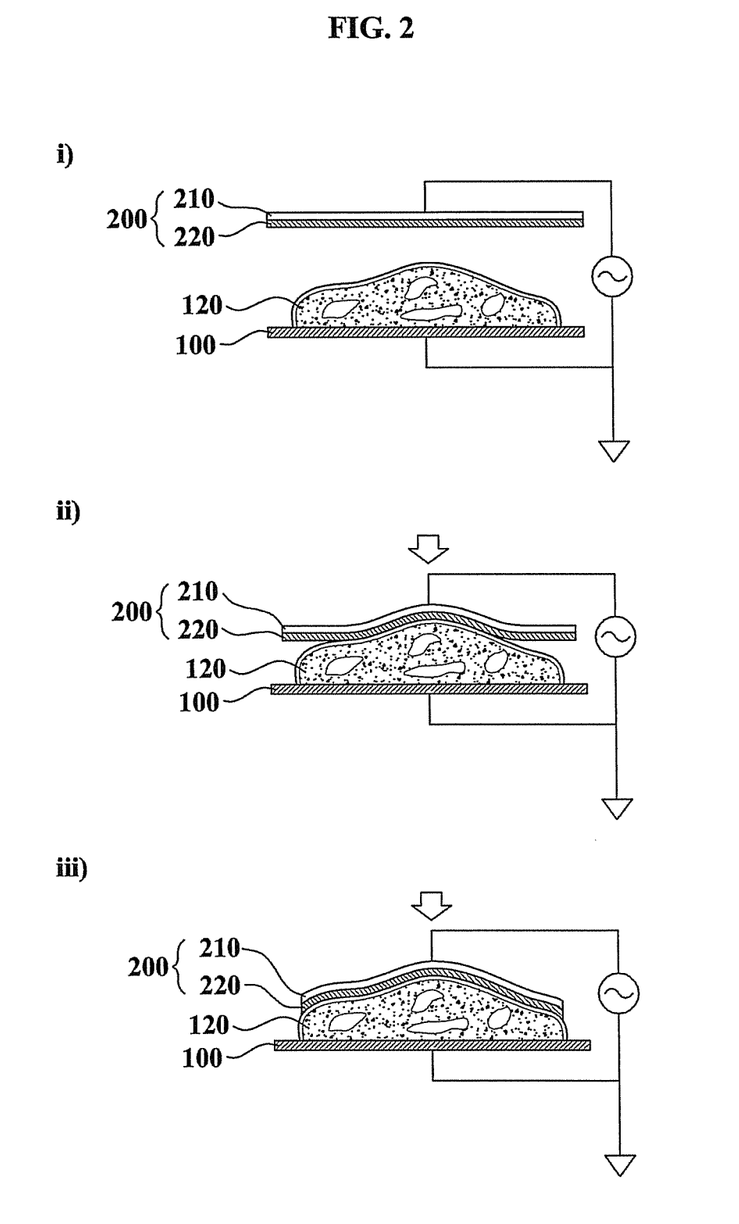
FIG. 2, parts i), ii), and iii), are exemplary illustrations of a system for maintaining freshness comprising an electrode module made of a flexible conducting polymer material.

In one embodiment, the invention provides a system for maintaining freshness comprising an electrode module made of a flexible conducting polymer material Referring to FIG. 2 part i), the electrode module of the system for maintaining freshness comprises a first electrode 200 comprising a conducting polymer material and a second electrode 100, wherein the first electrode 200 and the second electrode 100 connect with a power supply unit for generating an electric field between the first electrode 200 and the second electrode 100. An object of preservation 120 is positioned on the second electrode 100. The second electrode 100 is a plate-type electrode surrounded by a dielectric material. Specific examples of materials that are suitable for the plate type electrode consist of at least one of the group comprising gold (Au), silver (Ag), nickel (Ni), chrome (Cr), copper (Cu), Suss (Stainless steel) and indium tin oxide ("ITO"). Specific examples of the dielectric material corresponds to at least one of the group comprising glass, alumina, teflon, polyimide, polystyrene, polymethylmethacrylate, polyvinylalcohol, polyvinylphenol, poly(vinylidene fluoride) ("PVDF"), benzocyclobutene ("BCB"), parylene-C, 2-amino-4,5-imidazoledicarbonitrile, metal phthalocyanine, an organic selected from derivatives of one of the above organic compounds, silicon dioxide, silicon nitride derivative, aluminum oxide, aluminum nitride ("AIN"), aluminum oxynitride ("AlON"), and an inorganic selected from derivatives of one of the above inorganic compounds.

In FIG. 2 part i), similar to a prior art apparatus for maintaining freshness, since the distance between the object of preservation 120 and the first electrode 200 is comparatively great, the efficiency of the electric field which is generated may be reduced. Also, since the surface of the object of preservation 120 is beyond the effective range of the electric field, microorganisms present in the object of preservation 120, may not be effectively controlled using the electric field.

In another embodiment, the system for maintaining freshness further comprises an electrode control unit (not illustrated) to control the distance between the electrodes. As illustrated in FIG. 2 part ii), the electrode control unit drops to a height where the first electrode 200 makes contact with the surface of the thickest portion of the object of preservation 120, maintains the state for a predetermined period of time, then drops to a height where the first electrode 200 is in complete contact with the object of preservation, (as illustrated in FIG. 2 part iii), and stops.

In yet another embodiment, there is provided a highly efficient system for maintaining freshness which enables an electrode to make contact with the surface of the object of preservation 120 and which can thereby supply a highly efficient electric field to the object of preservation 120, uniformly generating a surface electric charge on the object of preservation for a short period of time.

According to one embodiment, the electrode module may comprise a plurality of first electrodes and a plurality of second electrodes, wherein the plurality of first electrodes and the plurality of second electrodes are positioned such that they generate a multiple surface structure.

According to another embodiment, the first modules may comprise a plurality of first electrodes, and the plurality of first electrodes and the plurality of second electrodes may be positioned such that they generate a multiple surface structure.

Figure 3:
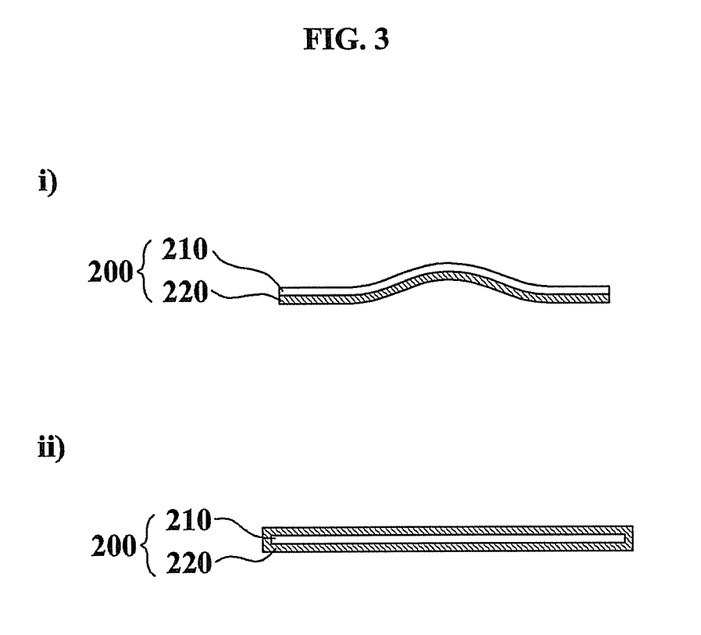
FIG. 3, parts i), and ii), are an exemplary illustrations of a structure of a first electrode comprising a flexible conducting polymer material of an electrode module.

According to yet another embodiment, a first electrode is provided comprising a flexible conducting polymer material and a non-conducting dielectric material. As illustrated in FIG. 3, parts i) and ii), the first electrode 200 comprises a flexible conducting polymer layer 210 and a non-conducting dielectric material layer 220. The conducting polymer layer 210 is made of at least one conductive polymer selected from the group consisting of polyacetylenes, polyanilines, substituted polyanilines, polypyrroles, polythiophenes, substituted polythiophenes, polycarbozoles, polyindoles, poly(p-phenylene)s, poly(p-phenylenevinylene)s, poly(ethylenedioxythiophene)s, or the like, and a combination comprising one or more of the foregoing conductive polymers. The non-conducting dielectric material layer 220 is a layer that directly contacts the object of preservation 120. Conversely, the conducting polymer 210 does not make direct contact with the object of preservation 120, and prevents the application of a direct voltage to the object of preservation 120.

As illustrated in FIG. 3, part i), the first electrode may be prepared by either laminating the conducting polymer layer 210 onto the non-conducting dielectric material layer 220, or by surrounding the conducting polymer layer 210 with the dielectric material layer 220. The non-conducting dielectric material layer 220 may be made of a flexible non-conducting polymer, however, as long as the dielectric material is physically flexible, the type of polymer used is not limited to a non-conducting polymer.

Figure 4:
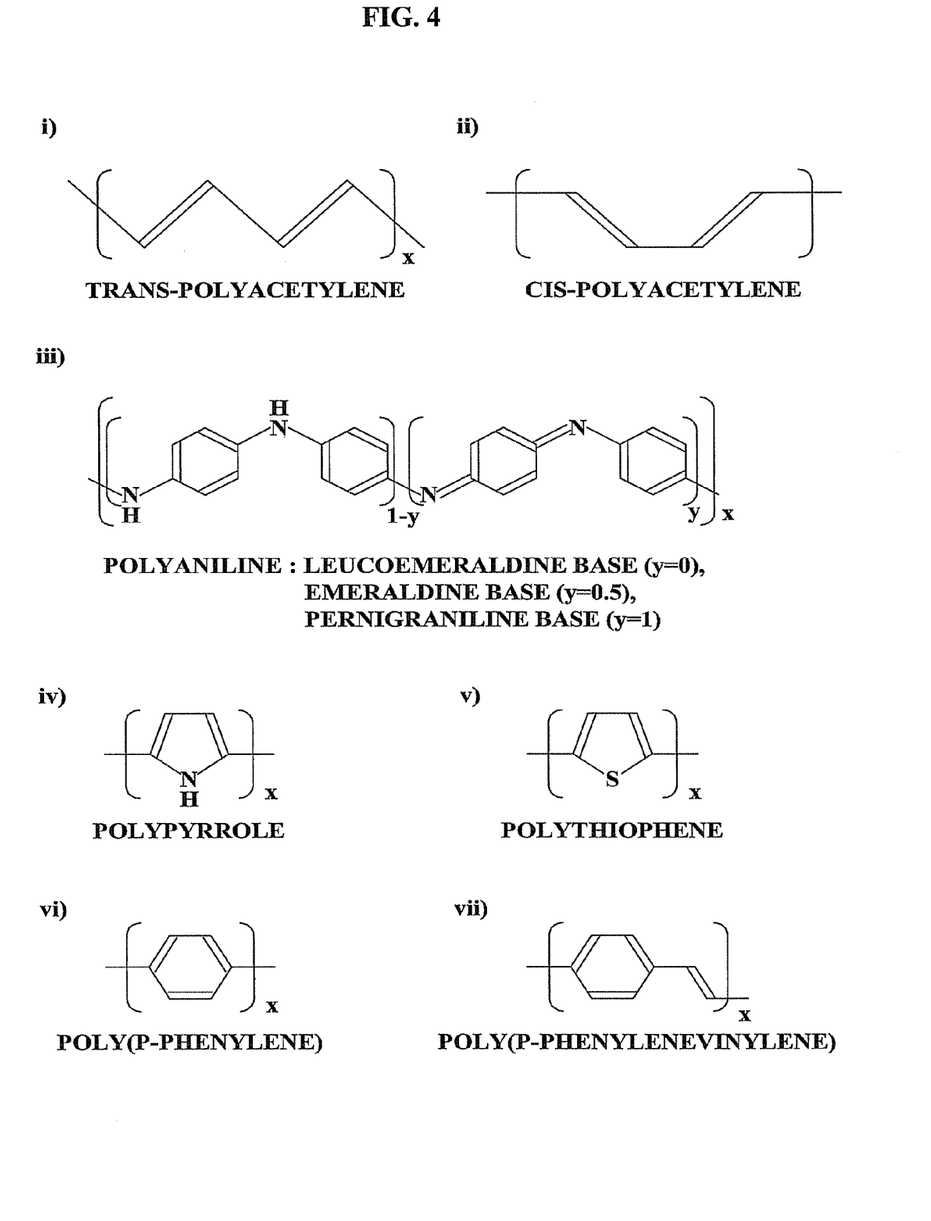
FIG. 4, parts i), ii), iii), iv), v), vi) and vii), are chemical structures of conducting polymers which can be used as a material in a first electrode.

In one embodiment, chemical structures are provided for a conducting polymer used in a first electrode is provided. As illustrated in FIG. 4, the conducting polymer materials have a chain structure, referred to as a "conjugation path", wherein a single bond and a double bond repeat. The conducting polymer materials may be transformed into highly electrically conductive materials via doping, since there are many $\pi$ combinations that can occur in the main chain. Specifically, doping occurs via a process where a dopant either eliminates an electron from the valence band of the conducting polymer or, the dopant adds an electron to the conduction band of the conducting polymer. The doping process results in the generation of an insulator-metal transition phenomenon wherein the electrical conductivity of the conducting polymer increases from a relatively low $10^{-10}$ S/cm to a relatively high $10^5$ S/cm rate. In a preferred embodiment, the invention provides a first electrode module comprising a flexible conducting polymer layer where the conductivity is high.

Figure 5:
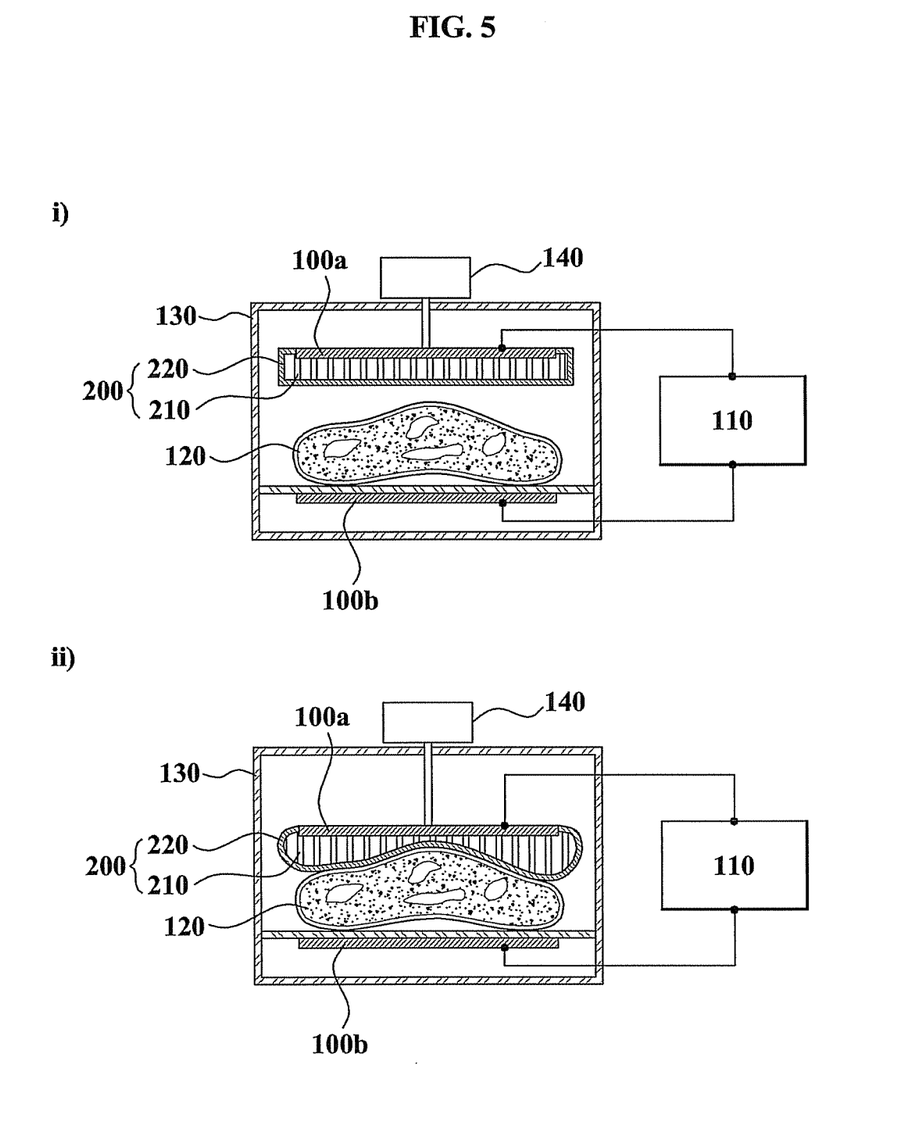
FIG. 5, parts i), and ii), are cross-sectional exemplary diagrams illustrating a structure of an apparatus for maintaining freshness.

FIG. 5, parts i) and ii), are exemplary cross-sectional diagrams illustrating a structure of a system for maintaining freshness according to an exemplary embodiment of the present invention. In FIG. 5 part i), a system for maintaining freshness comprises an electrode module and an electric field supply module 110. The electrode module comprises a first electrode 200, and a second electrode 100b which face each other, wherein the first electrode 200 and the second electrode 100b are connected with an electric field supply module 110 which generates an electric field between the first electrode 200 and the second electrode 100b.

The electric field supply module 110 generates an electric field between the first electrode 200 and the second electrode 100b, by supplying a voltage to the electrode module that has a predetermined frequency range. The electric field supply module 110 supplies the voltage which comprises voltage types from any one of the group consisting of a pulse voltage, an alternating current voltage, a direct current voltage, and a combination of one or more of the foregoing voltage types. Preferably, an alternating current voltage is supplied in the form of a sine wave or a square wave. More preferably, a combination of voltages may supply the alternating current voltage in a pulse form, and further supply the alternating current voltage by combining the alternating current voltage with a direct current (DC) bias. Also, it is preferable that the electric field has a strength of less than 100 kV/m, and a frequency of less than 1 MHz.

In another embodiment, the highly efficient system for maintaining freshness further comprises an electrode control unit 140 controlling a distance between the first electrode 200 and the second electrode 100b. The electrode control unit 140 (FIG. 5) connects with the first electrode 200 via a connection unit 100a. The connection unit 100a is made of a conductive material and is electrically connected to the electric field supply module 110 along with the first electrode 200. Referring to FIG. 5 part ii), the electrode control unit 140 drops to a height wherein the first electrode 200 makes contact with the thickest portion of the surface of the object of preservation 120, maintains the state for a predetermined period of time, then drops to a height wherein the first electrode 200 is in complete contact with the object of preservation 120, and stops.

In yet another embodiment, there is provided a highly efficient system for maintaining freshness which enables an electrode to make contact with a surface of the object of preservation 120 thereby supplying a highly efficient electric field to the object of preservation 120, and uniformly generating an electric charge across the surface of the object of preservation for a short period of time.

Figure 6:
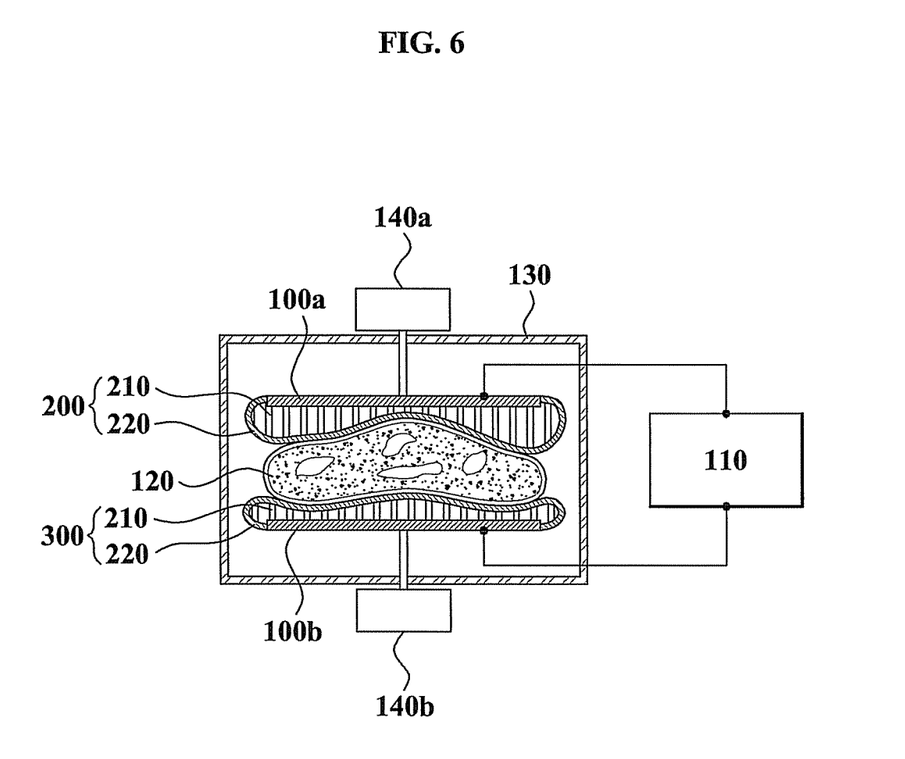
FIG. 6 is a cross-sectional exemplary diagram illustrating a structure of a highly efficient system for maintaining freshness.

In accordance with one embodiment, the second electrode comprises a flexible polymer layer abd a non-conducting dielectric material layer. FIG. 6 illustrates a basic structure of a system for maintaining freshness that wherein the second electrode comprises the flexible conducting polymer layer 210 and the non-conducting dielectric material layer 220. In FIG. 6, the electrode control unit 140b may connect with the second electrode via a connection unit 100b, in order to control the distance between the first electrode and the second electrode. The connection unit 100b is made of a conductive material and is electrically connected to the electric field supply module 110 along with the second electrode.

Since the first electrode and the second electrode each comprise the flexible conducting polymer layer, the electric field may be supplied more efficiently.

Figure 7:
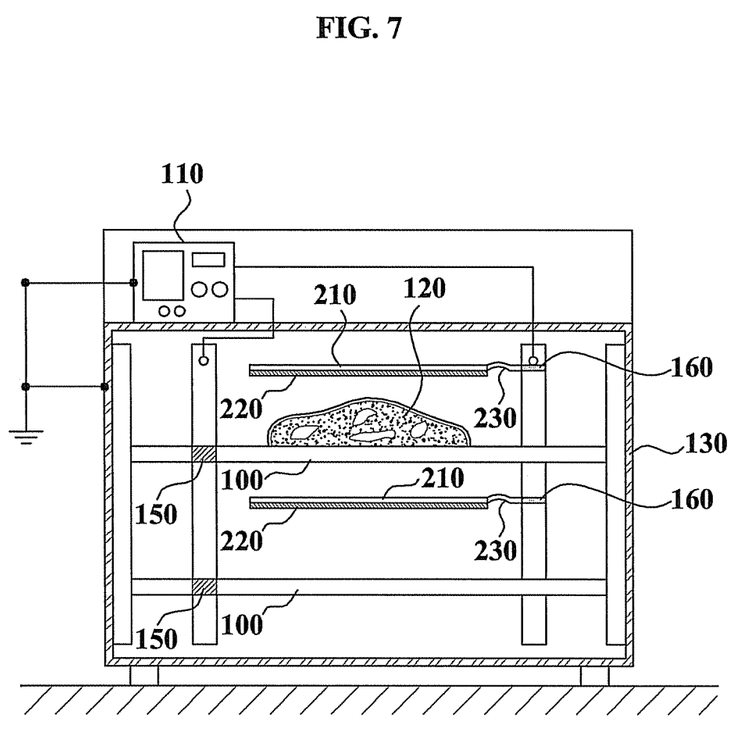
FIG. 7 is a cross-sectional exemplary diagram illustrating a structure of a system for maintaining freshness comprising a first substitutable electrode structure.

In accordance with another embodiment, a system for maintaining freshness is provided having a first substitutable electrode structure. FIG. 7 is a cross-sectional diagram illustrating the structure of a system having a first substitutable electrode structure. Referring to FIG. 7, the first substitutable electrode structure comprises an electrode module comprising a first electrode and a second electrode which face each other, and an electric field supply module 110 that supplies a voltage to the electrode module which then generates an electric field between the first electrode and the second electrode that has a predetermined frequency range. The first electrode comprises a flexible conducting polymer material 210 and a non-conducting dielectric material layer 220. The non-conducting dielectric material layer 220 is a layer that makes direct contact with the object of preservation 120, wherein the conducting polymer 210 does not make direct contact with the object of preservation 120 and thereby prevents the application of a direct voltage to the object of preservation 120. The first electrode may be prepared by laminating the non-conducting dielectric material layer 220 onto the conducting polymer layer 210, or alternatively, by surrounding the conducting polymer layer 210 with the non-conducting dielectric material layer 220. Further, the object of preservation 120 is positioned on the second electrode wherein the second electrode may be a plate-type electrode.

In accordance with yet another embodiment, the first substitutable electrode structure may further comprise a combination module 230 that is electrically connected to the electrode module along with the electric field supply module 110. The combination module 230 is a module that provides an electrical connection between the electrode module and the electric field supply module 110. The combination module 230 may be made of a flexible conducting material, for example, a flexible printed circuit board (PCB). The combination module 230 is not limited to the PCB and any flexible material may be used, by electrically connecting the electrode module with the electric field supply module 110.

Figure 8:
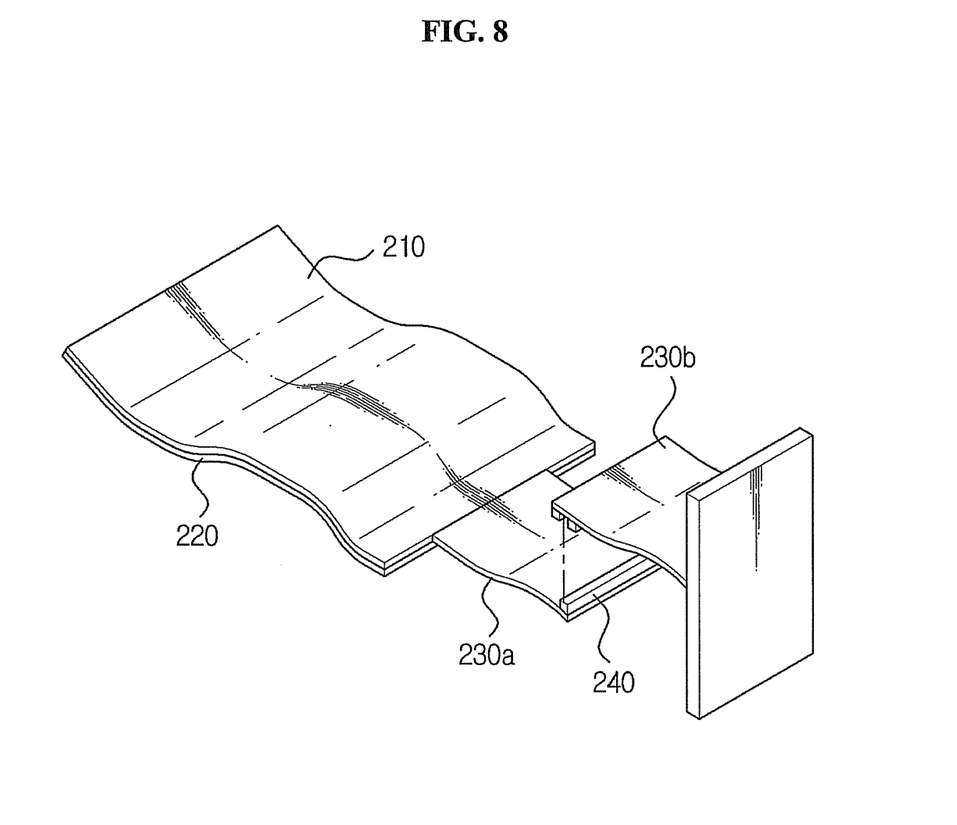
FIG. 8 is a diagram illustrating a structure of the first substitutable electrode of FIG. 7.

The combination module 230 provides an electrical connection between the first electrode and the electric field supply module wherein the first electrode is detachable from the electric field supply module via the combination module 230. The structure of the first substitutable electrode and of the combination module 230 (FIG. 7), are illustrated in further detail in FIG. 8. The combination module comprises an extension unit 230a, connected with the conducting polymer layer 210, and an extension unit 230b, that provides the electrical connection with the electric field supply module 110 (FIG. 7). The extension unit 230b may further comprise a connector 240 for a structure that may be combined. That the connector 240 may be constructed in either the extension unit 230a and/or the extension unit 230b is obvious to those of ordinary skill in the art. By employing a first electrode that is detachable, the electrode can easily be replaced thereby ensuring the efficiency of the apparatus is maintained. In addition, due to lower manufacturing costs, the electrode can also be replaced frequently, as needed.

Figure 9:
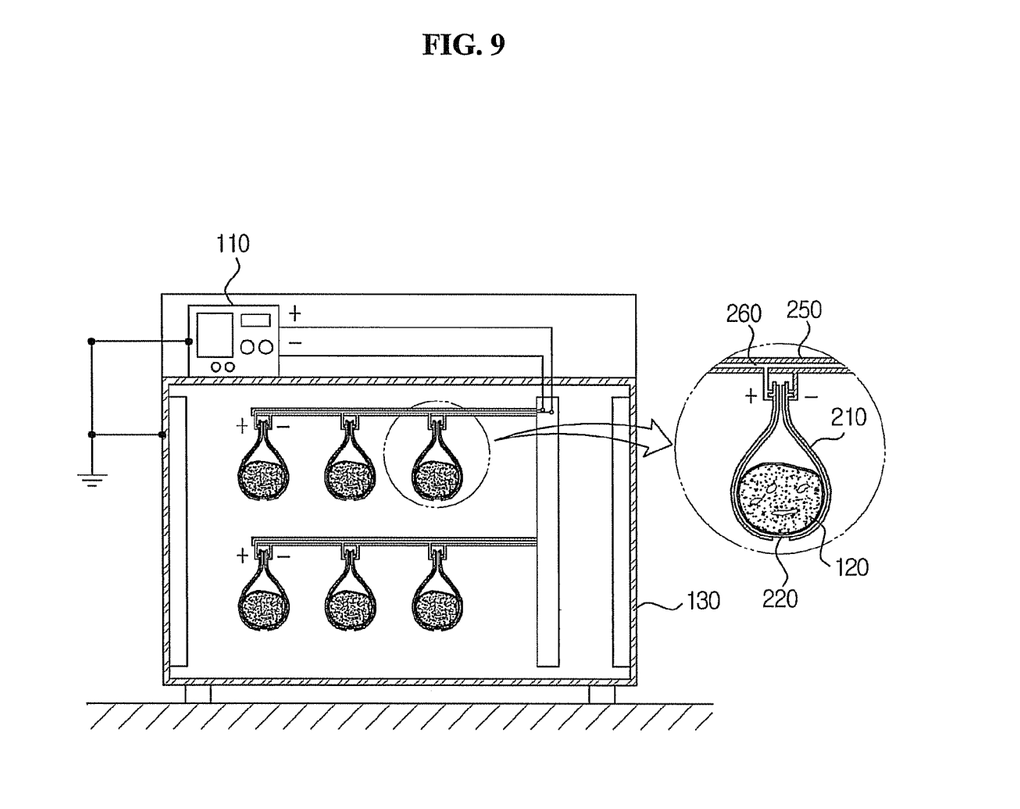
FIG. 9 is an exemplary diagram illustrating a system for maintaining freshness comprising an electrode module of a first zipper-bag type and, the electrode module according to another exemplary embodiment of the present invention.

In one embodiment, a system for maintaining freshness is provided comprising an electrode module of a first zipper-bag type. Referring to FIG. 9, the electrode module consists of a structure that surrounds an object of preservation 120 in the form of a zipper-bag. The electrode module of the first zipper-bag type includes a structure comprising a flexible dielectric material layer 220 that surrounds the object of preservation 120 thereby preventing direct contact between the object of preservation 120 and the electrode. The electrode is comprised of a conducting polymer layer 210 that is used to form both an anode and a cathode on the exterior surface of a zipper-bag structure through contact with the flexible dielectric material layer 220. Any flexible insulation material, for example a non-conducting polymer, can be used for the flexible dielectric material layer 220. The conducting polymer layer 210, which forms both the anode and the cathode, is connected to the shelf units 250 and 260 that support the zipper-bag structure, wherein the shelf units 250 and 260 are in turn electrically connected to the electric field supply module 110.

Figure 10:
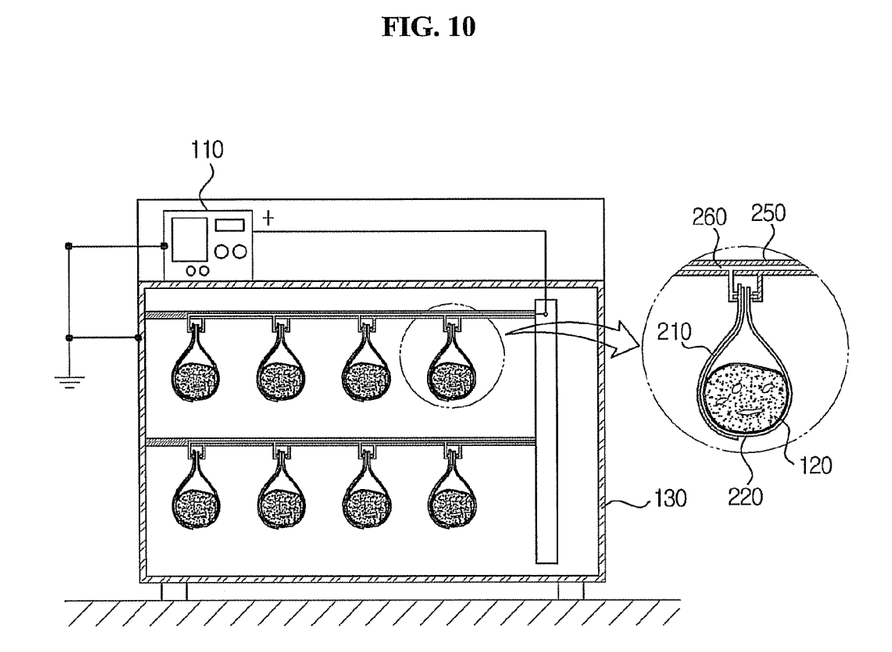
FIG. 10 is an exemplary diagram illustrating a system for maintaining freshness including an electrode module of a second zipper-bag type and, the electrode module according to another exemplary embodiment of the present invention.

In another embodiment, a system for maintaining freshness is provided comprising an electrode module of a second zipper-bag type. Referring to FIG. 10, the electrode module of the second zipper-bag type, similar to the electrode module of the first zipper-bag type, comprises a structure that surrounds an object of preservation 120 in the form of zipper-bag. The electrode module of the second zipper-bag type includes a structure comprising a flexible dielectric material layer 220 that surrounds the object of preservation 120 thereby preventing direct contact between the object of preservation 120 and the electrode. The electrode is comprised of a conducting polymer layer 210 that is used to form the anode on an exterior surface of the zipper-bag structure through contact with the flexible dielectric material layer 220. Unlike the electrode module of the first zipper-bag type in FIG. 9, the electrode module of the second zipper-bag type in FIG. 10 comprises a structure wherein the shelf unit 250 is grounded.

According to the system for maintaining freshness comprising the electrode modules of zipper-bag types (FIG. 9 and FIG. 10), the placement and removal of the object of preservation 120 is unrestricted due to the zipper-bag type structure. In addition, the electrode may make contact with the surface of the object of preservation 120 thereby facilitating the generation of a uniform surface electric charge on the object of preservation 120 for a short period of time. Accordingly, a system is provided for maintaining freshness, which can supply a highly efficient electric field, thereby consuming a small amount of power.

According to one embodiment, there is provided a system for maintaining freshness comprising a flexible conducting polymer, which can make contact with a surface of an object of preservation and supply a highly efficient electric field to the object of preservation.

According to another embodiment, there is provided a highly efficient system for maintaining freshness, which enables an electrode to make contact with a surface of an object of preservation, thereby uniformly generating a surface electric charge on the object of preservation for a short period of time.

According to yet another embodiment, there is provided a system for maintaining freshness, which can supply a highly efficient electric field by using a flexible conducting polymer for a material of an electrode, thereby consuming a small amount of power.

According to an additional embodiment, there is provided a system for maintaining freshness, in which an electrode is substitutable, i.e. detachable, by using a flexible conducting polymer for a material of the electrode, and where the electrode can be replaced frequently due to low manufacturing costs.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A system for maintaining freshness, the system comprising:

an electrode module comprising a first electrode and a second electrode which face each other; wherein the second electrode is a plate electrode surrounded by a dielectric material; where the entire plate electrode is in intimate contact with the dielectric material; and an electric field supply module; the electric field supply module being operative to generate an electric field between the first electrode and the second electrode by supplying a voltage to the electrode module, wherein the first electrode comprises a flexible conducting polymer material, wherein the first electrode directly contacts a first dielectric layer and wherein the first dielectric layer and the dielectric material are operative to contact an irregular object of preservation along a substantial portion of its entire irregular surface.

2. The system of claim 1, wherein the electrode module comprises a plurality of first electrodes and a plurality of second electrodes, wherein the plurality of first electrodes and the plurality of second electrodes generate a multiple surface structure.

3. The system of claim 1, wherein the conducting polymer is at least one selected from the group consisting of polyacetylene, polyaniline, substituted polyaniline, polypyrrole, polythiophene, substituted polythiophene, polycarbozole, polyindole, poly(p-phenylene), poly(p-phenylenevinylene), poly(ethylenedioxythiophene), and a combination comprising one or more of the foregoing conductive polymers.

4. The system of claim 3, wherein the conducting polymer is at least one of the group consisting of trans-polyacetylene, cis-polyacetylene, polyaniline, polypyrrole, polythiophene, poly(p-phenylene) and poly(p-phenylenevinylene).

5. The system of claim 1, wherein the electric field has a strength of less than 100 kV/m, has a frequency of less than 1 MHz, and has a form of any one of a sine wave form, a square wave form, or a pulse wave.

6. The system of claim 1, wherein the plate electrode is made of at least one of the group consisting of gold (Au), silver (Ag), nickel (Ni), chrome (Cr), copper (Cu), platinum (Pt), aluminum (Al), stainless steel and indium tin oxide (ITO).

7. The system of claim 1, wherein the dielectric material comprises at least one of the group consisting of glass, alumina, polytetrafluoroethylene, polyimide, polystyrene, polymethylmethacrylate, polyvinylalcohol, polyvinylphenol, polyvinylidene fluoride (PVDF), benzocyclobutene (BCB), poly(chloro-p-xylene), 2-amino-4,5-imidazoledicarbonitrile, metal phthalocyanine;

an organic selected from derivatives of one of the above organic compounds, silicon dioxide, silicon nitride derivative, aluminum oxide, aluminum nitride (AlN), aluminum oxynitride (AlON), and an inorganic selected from derivatives of one of the above inorganic compounds.

8. The system of claim 1, wherein the electric field supply module supplies the voltage, the voltage comprising any one of the group consisting of a pulse voltage, an alternating current voltage, a direct current voltage, and a combination of one or more of the forgoing voltages.

9. The system of claim 1, wherein the first dielectric material layer surrounds the flexible conducting polymer layer.

10. The system of claim 1, further comprising:

a combination module electrically connecting the first electrode with the electric field supply module, wherein the combination module enables the first electrode to be detachable from the electric field supply module.

11. The system of claim 10, wherein the combination module is a printed circuit board (PCB).

12. The system of claim 1, further comprising:

an electrode control unit; the electrode control unit being operative to control a distance between the first electrode and the second electrode.

13. A system for maintaining freshness, the system comprising:

an electrode module comprising a first electrode and a second electrode which face each other;

wherein the second electrode is a flexible plate electrode in contact with a dielectric material; wherein the entire plate electrode is in intimate contact with the dielectric material;

wherein the first electrode comprises a flexible conducting polymer material, wherein the first electrode directly contacts the dielectric material; wherein the dielectric material is operative to contact an irregular object of preservation along a substantial portion of its entire irregular surface; and wherein the dielectric material is in the form of a zipper bag; and an electric field supply module; the electric field supply module being operative to generate an electric field between the first electrode and the second electrode by supplying a voltage to the electrode module.

14. The system of claim 13, wherein the dielectric material comprises a non-conducting polymer material.

* * * * *